Patented Aug. 13, 1940

2,211,625

UNITED STATES PATENT OFFICE 2,211,625

PROCESS FOR THE PREPARATION OF ALKYL GLYCOLATES

Donald J. Loder, Wilmington, Del., assignor to E. I. du Pont de Nemours & Company, Wilmington, Del., a corporation of Delaware No Drawing. Application September 14, 1938, Serial No. 229,875

17 Claims. (Cl. 260—484)

This invention relates to a process for the preparation of esters of glycolic acid and is more especially related to the preparation of esters of glycolic acid by the interaction of formaldehyde and an alcohol with carbon monoxide.

Glycolic acid, otherwise known as hydroxyacetic acid or ethanolic acid and having the formula $CH_2OHCOOH$, has been usually prepared heretofore by treating monochloracetic acid with caustic potash, the esters being made, if desired, by simple esterification of the acid with the appropriate alcohol. In an attempt to develop a more economical process for the preparation of the acid, various other methods have been proposed as, for example, by the oxidation of ethylene glycol to glycolic aldehyde followed by the subsequent oxidation of glycolic aldehyde to glycolic acid and by the preparation of formaldehyde cyanhydrin followed by hydration. Due in large measure to the high cost of the basic materials required for the manufacture of this acid by these and other known processes, the acid and its esters made therefrom have been expensive, and consequently have been limited in many of the important uses for which they are adapted.

An object of the present invention is to provide an improved process for the preparation of glycolic acid esters. Another object of the invention is to provide an economical process for the preparation of glycolic acid esters from inexpensive raw materials. Yet another and more specific object of the invention is to provide a process wherein formaldehyde and an aliphatic monohydric alcohol are interacted with carbon monoxide in the presence or absence of water and an acidic type catalyst to obtain an alkyl glycolate. A further object is to provide a catalyst for this process. Other objects and advantages of the invention will hereinafter appear.

The above and other objects of the invention are realized by dissolving formaldehyde, or one of its polymers, in an anhydrous alcohol or an alcohol in the presence of water and, preferably using a catalyst having acidic characteristics, subjecting the resulting solution to heat and pressure and an atmosphere of carbon monoxide whereupon an ester of glycolic acid is obtained in accordance with the equation:

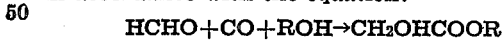

R designating an alkyl group such as methyl, ethyl, normal and isopropyl, normal and isobutyl, amyl, hexyl and the higher alkyl groups such, for example, as cyclohexyl, octyl, nonyl, benzyl and the like. Polyhydric alcohols and their ethers may likewise be substituted for ROH, e. g., ethylene glycol, as well as its monoalkyl ethers, e. g., monomethyl and monoethyl ethers of ethylene glycol et al. This reaction may be carried out by passing the mixture of the aldehyde, alcohol and catalyst, in the presence or absence of water, into a converter and applying the necessary pressure by forcing carbon monoxide into the reactants, the reaction being effected at a suitable temperature.

The formaldehyde may be subjected to the reaction in any convenient way or in any convenient form. Thus, formaldehyde may be dissolved in water to give an aqueous solution thereof containing up to approximately 62% formaldehyde (for instance, technical "formalin"), or solutions of polymeric formaldehyde, e. g., paraformaldehyde or trioxymethylene, may be used. Such solutions may be employed for reaction with carbon monoxide, after, if desired, dissolving therein a suitable quantity of catalyst.

I have found that, in the absence of added catalysts the reaction is initiated slowly but, being mildly autocatalytic, will proceed progressively more rapidly after it has started, since glycolic acid, which is present, and acidic by-products of the reaction, such as formic acid, accelerate the reaction. Initiation of the reaction is more rapid if a compound of an acidic nature, for example, an organic acid, such as glycolic acid or formic acid, or an inorganic acid, such as hydrochloric, sulfuric or phosphoric acid is present, although the reaction will start without the addition of any substance in the nature of the catalyst.

Added catalysts are not, therefore, required to either institute or maintain the reaction, but I have found that they may be used with advantage to insure more rapid attainment of equilibrium conditions. The deleterious effect of certain side reactions may be lessened appreciably by accelerating the glycolic acid ester synthesis reaction. This is accomplished by adding such widely different compounds as formic acid, phosphoric acid, sodium acid phosphate, glycolic acid itself and hydrochloric acid. Many actual trials have demonstrated that organic and inorganic catalysts which have or give a free hydrogen ion are suitable altho, of course, some are more effective than others.

Acidic catalysts generally, which are especially active in promoting the synthesis of aliphatic acids in accord with the known process of preparing these acids by the interaction of aliphatic alcohols with carbon monoxide and more particularly those of this class which give a pH value in aqueous solution of less than 7 may, if desired, be employed for catalyzing the reaction of this invention. A number of the catalysts which are suitable, all of which catalysts are of an acidic nature, include, for example, the inorganic acids and especially hydrochloric acid; inorganic acidic salts, such, for example, as potassium acid sulfate, sodium acid phosphate, boron fluoride; and generally the acidic catalysts designated in the patents to G. B. Carpenter, A. T. Larson and J. C. Woodhouse, Nos. 1,924,766, 2,037,654 and 2,053,233, respectively. Organic acids and organic acid salts may likewise be employed, such, for example, as formic, acetic, glycolic acids and their salts and acid esters.

These catalysts may be used in amounts ranging from 0.02 to 1.0 mol thereof per mol of formaldehyde, although the range between 0.02 to 0.15 is preferred. Proportions higher than 1.0 mol per mol of formaldehyde, however, may be used in many instances, such, for example, as in processes in which boron trifluoride or hydrochloric acid are employed as a catalyst. While with sulfuric acid as the catalyst, the ratio of from 0.02 to 0.15 mol thereof per mol of formaldehyde is preferred. Such catalysts may be employed in amounts up to and even greater than molal proportions with the formaldehyde, but usually, in order to facilitate the separation of the glycolic acid ester or its derivatives from the reaction product, it is preferable to employ proportions of the catalyst within the range specified. It will be found that with increased catalyst amount the reaction will proceed at a lower temperature and/or pressure while with decreased catalyst amount a somewhat higher temperature and/or pressure is required to effect the reaction at an equal rate.

For the preparation of glycolic acid esters it is preferable to have a quantity of water present equal to at least 0.5 mol of water per mol of the formaldehyde present. While concentrations of water higher than 1.0 mol per mol of formaldehyde may be present the higher concentrations, say, 15 to 20 mols per mol of formaldehyde, are not used advisedly for they tend to lower the concentration of the product with resultant greater difficulty in subsequent concentration thereof.

The preparation of glycolic acid esters is carried out by having present an alcohol together with the formaldehyde and, if desired, water. As has been indicated, various aliphatic monohydric alcohols may be used in lieu of or together with water and such alcohols as methanol, ethanol, propanol, butanol, ethylene glycol and the higher alcohols may be used to produce directly the corresponding esters of glycolic acid. Generally, I prefer to employ per mol of formaldehyde present at least 0.5 and preferably from 0.5 to 6 mols of alcohol; water, (in ester reactions), being preferably present in the ratio of from 0.5 mol to 6 mols thereof per mol of the formaldehyde.

The carbon monoxide required for the synthesis may conveniently be derived from various commercial sources, as, for example, from water gas, producer gas, etc., by liquefaction or other methods and should for best results be relatively pure. The carbon monoxide should preferably be present in sufficient excess to insure an adequate supply thereof for absorption by the formaldehyde in order to inhibit any appreciable decomposition of the formaldehyde to carbon monoxide and hydrogen or other products.

The reaction proceeds at ordinary pressures although it is advantageous to use pressures in excess of atmospheric, say from 5 to 1500 atmospheres or more. The reaction, which is exothermic, may be effected over a wide range of temperatures although the optimum temperature varies with specific conditions depending upon the relative concentrations of catalysts, water, formaldehyde and carbon monoxide. Generally, the reaction can be carried out at temperatures ranging from 50° C. to 350° C., although temperatures ranging between 125 and 225° C. have been found preferable. Mild cooling means should generally be provided to maintain the temperature within the selected range. By subjecting the reactants to temperatures and pressures within the designated ranges the normally liquid reactants are maintained in the liquid phase and apparently the carbon monoxide is forced into the liquid and reacts therein with the formaldehyde and water present. While the invention is not limited to any theory or explanation of the operation of the process the foregoing appears satisfactorily to explain its mechanism and accordingly in certain of the claims the process is designated as being conducted in the liquid phase for the reaction appears to take place primarily, if not entirely, in that phase.

The reaction product consists essentially of a solution containing ester, glycolic acid, a small amount of formic acid, unconverted formaldehyde, the catalyst, if such be used, and water. The glycolic acid and ester may be separated from this crude mixture by distillation, preferably after the addition of an alcohol corresponding to that used in the synthesis, the distillation being preferably carried out at from 80 to 100 mm. pressure.

The following examples will illustrate methods of practicing the invention although it will be understood that the invention is not limited to the details therein given. The percentage yields given are calculated on the formaldehyde used.

*Example I.*—There was placed in a high pressure silver-lined autoclave a mixture containing 1 mol of formaldehyde, 1 mol of methanol, 6 mols of water and 0.05 mols of sulfuric acid. A carbon monoxide atmosphere was superimposed above the liquid and its pressure increased to 800–900 atmospheres. The autoclave and contents were heated to a temperature between 210 and 220° C. for approximately 60 minutes with continuous agitation. The pressure was released and the contents of the autoclave analyzed to indicate an approximate 40% yield of methyl glycolate.

*Example II.*—An autoclave charge containing 1 mol of formaldehyde, 6 mols of methanol, 6 mols of water and 0.05 mol of sulfuric acid was processed in a manner similar to that given in Example I at a temperature between 259 and 263° C. and at 900 atmospheres pressure for approximately 35 minutes. Analysis of the product indicated the presence of approximately 50% methyl glycolate.

*Example III.*—An autoclave was charged with approximately 5 mols of glycolic acid, 3 mols of methanol, 3 mols of formaldehyde and 1.25 mols of water and 0.09 mol of sulfuric acid. This mixture was subjected to a temperature between 134 and 140° C. and a carbon monoxide pressure of 700 atmospheres for 53 minutes. The analysis of the product indicated approximately 30% methyl glycolate.

*Example IV.*—The process of Example III was repeated utilizing substantially the same molecular ratio of reactants, the temperature, however, being maintained at 160° C., the pressure of carbon monoxide at 700 atmospheres and the reaction time shortened to approximately 10 minutes. Approximately a 25% yield of methyl glycolate was indicated.

*Example V.*—An autoclave was charged with approximately 1 mol of formaldehyde, 1.5 mols of ethylene glycol, 6 mols of water and 0.1 mol of sulfuric acid. This mixture was subjected to a temperature between 203 and 208° C. and a carbon monoxide pressure of 800–900 atmospheres for 60 minutes. An appreciable yield of glycol glycolate was obtained.

While the examples have referred particularly to carrying out the process in a more or less discontinuous manner the process of the invention may likewise be effected in a continuous manner by passing the aldehyde, alcohol, water and catalyst through a reaction zone either co-current or counter-current to the flow of carbon monoxide, the rates of flow being adjusted to yield the desired degree of reaction. The carbon monoxide should be maintained, as in the processes described in the examples, at a suitable pressure and the temperature of the continuous reaction should be held within the prescribed range by suitable heating means.

In order to insure adequate intimate contact between the reactants, thorough stirring is an essential to high yields when conducting the process in an autoclave and no manner what the type of reaction vessel used intimate contact is of considerable importance if optimum results are desired.

Because of the corrosive nature of the catalyst and reactants it is advisable to carry out the process of the present invention in glass, silica, porcelain-lined or glass-lined vessels, or the inner surfaces of the reaction vessel which contact with the reactants should be constructed of such corrosion-resistant metals as silver, chromium, stainless steel, and the like.

When formaldehyde is referred to in the appended claims it will be understood that paraformaldehyde, formalin, or trioxymethylene or other polymeric or monomeric form of formaldehyde as well as formaldehyde are also included.

From a consideration of the above specification it will be appreciated that many details therein given may be changed without departing from the scope of the invention or sacrificing any of the advantages that may be derived therefrom.

I claim:

1. A process for the preparation of a glycolic acid ester which comprises reacting formaldehyde and an aliphatic monohydric alcohol with carbon monoxide.

2. Process of claim 1 carried out in the presence of a hydrogen ion concentration on the acid side of pH 7.

3. The process of claim 1 conducted in the presence of an acidic catalyst adapted for carrying out the interaction of alcohols with carbon monoxide to give aliphatic organic acids.

4. The process of claim 1 conducted at a pressure between 5 and 1500 atmospheres.

5. The process of claim 1 conducted at a temperature between 50 and 350° C.

6. A process for the preparation of a glycolic acid ester which comprises reacting a formaldehyde, water and an aliphatic monohydric alcohol with carbon monoxide at a temperature between 125 and 225° C. and under a pressure of at least 5 atmospheres, at least 0.5 mol of alcohol being present per mol of formaldehyde.

7. The process of claim 6 conducted with sulfuric acid as the catalyst.

8. The process which comprises reacting formaldehyde, water and an aliphatic monohydric alcohol with carbon monoxide and thereby producing an alkyl glycolate.

9. A process for the preparation of a glycolic acid ester which comprises intimately contacting carbon monoxide with an aqueous solution containing formaldehyde, an aliphatic monohydric alcohol, water and an acidic type catalyst, there being present per mol of formaldehyde at least 0.5 mol of water and from 0.02 to 1 mol of catalyst.

10. A process for the preparation of a glycolic acid ester which comprises intimately contacting carbon monoxide with an aqueous solution containing formaldehyde, an aliphatic monohydric alcohol, water and an acidic type catalyst, there being present per mol of formaldehyde from 0.5 to 6 mols of alcohol and from 0.5 to 6 mols of water.

11. A process of making methyl glycolate which comprises reacting formaldehyde, water and methanol with carbon monoxide.

12. A process of making ethyl glycolate which comprises reacting formaldehyde, water and ethanol with carbon monoxide.

13. A process of making butyl glycolate which comprises reacting formaldehyde, water and a butyl alcohol with carbon monoxide.

14. A process of making methyl glycolate which comprises reacting formaldehyde, water and methanol with carbon monoxide at a temperature between 125 and 225° C., a pressure of at least 5 atmospheres with from 0.02 to 0.15 mol of sulfuric acid per mol of formaldehyde as the catalyst.

15. A process for the preparation of methyl glycolate which comprises reacting approximately 1 mol of formaldehyde, 6 mols of methanol and 6 mols of water with 0.05 mol of sulfuric acid as the catalyst with carbon monoxide at a temperature between approximately 259 and 263° C. and at a pressure of 900 atmospheres.

16. A process for the preparation of an alkyl glycolate which comprises reacting formaldehyde, water, and an aliphatic monohydric alcohol with carbon monoxide at a temperature between 125 and 225° C. and under a pressure of from 5 to 1500 atmospheres.

17. A process for the preparation of a glycolic acid ester which comprises interacting formaldehyde, carbon monoxide and an aliphatic monohydric alcohol in accord with the equation $$HCHO + ROH + CO \rightarrow CH_2OHCOOR$$

in which R designates an alkyl group, the reaction being conducted in the presence of a catalyst, at a temperature between 125 and 225° C. and under a pressure in excess of 5 atmospheres.

DONALD J. LODER.